(12) United States Patent
DeCost

(10) Patent No.: US 6,589,458 B2
(45) Date of Patent: Jul. 8, 2003

(54) METHOD OF MOLDING A CART USING MOLDING PROCESSES

(75) Inventor: Norman DeCost, Midlothian, VA (US)

(73) Assignee: Rehrig International, Inc., Richmond, VA (US)

( * ) Notice: Subject to any disclaimer, the term of this patent is extended or adjusted under 35 U.S.C. 154(b) by 0 days.

(21) Appl. No.: 09/819,652

(22) Filed: Mar. 29, 2001

(65) Prior Publication Data

US 2001/0035618 A1 Nov. 1, 2001

Related U.S. Application Data

(63) Continuation-in-part of application No. 09/552,876, filed on Apr. 20, 2000, now abandoned.

(51) Int. Cl.$^7$ ............................ B29C 44/02; B29C 49/06
(52) U.S. Cl. ......................... 264/50; 29/527.1; 29/572; 29/573; 264/53
(58) Field of Search ............................. 264/50, 51, 53, 264/54, 572, 573; 29/527.1

(56) References Cited

U.S. PATENT DOCUMENTS

| | | | |
|---|---|---|---|
| 3,999,774 A | * 12/1976 | Rehrig | .................. 280/33.991 |
| 4,046,394 A | 9/1977 | Thompson, Jr. | |
| 4,106,887 A | 8/1978 | Yasuike et al. | |
| 4,129,635 A | 12/1978 | Yasuike et al. | |
| 4,139,098 A | * 2/1979 | Mollon | ....................... 206/507 |
| 4,234,642 A | 11/1980 | Olabisi | |
| 4,247,515 A | 1/1981 | Olabisi | |
| 4,268,049 A | 5/1981 | Salvador | |
| 4,273,346 A | 6/1981 | Rehrig | |
| 4,286,795 A | 9/1981 | Rehrig | |
| 4,424,287 A | 1/1984 | Johnson et al. | |

(List continued on next page.)

OTHER PUBLICATIONS

Website: "www.supercart.com", "Welcome to Supercart", "Supercart Benefits" and "Supercart Features and Specifications", Copyright 1998, pp. 1–8.

Website: "www.modplas.com", "Contentious Chapter Ends for Gas–Assist Processors", Mar. 2000, pp. 72–74.

Website: "www.plasticstechnology.com", "Mold Hollow Parts Faster With Water Instead of Gas", Jan. 2000, p. 11.

Website: "www.actech.com/cm_info/gas–inj2.htm", "C–Mold: Gas–Assisted Injection Molding Simulation", pp. 1–2, (undated).

Website: "www.sajarplastics.com/gas.htm", "Sajar Plastics, Inc.: Gas Assist Technology", pp. 1–2, (undated).

Website: "www.mulay.com/gas.htm", "Mulay Plastics: Gas Assisted Injection Molding Gain That is!", pp. 1–3, (undated).

(List continued on next page.)

Primary Examiner—Allan R. Kuhns
(74) Attorney, Agent, or Firm—McGuireWoods LLP

(57) ABSTRACT

A method of molding components of a shopping cart using high or low pressure molding processes. The molding processes eliminate sink marks in plastic components of the shopping cart while providing structural integrity thereto. The processes used to mold the components of the shopping cart can create either or both a center channel in the molded components and/or a plurality of voids within the molded components. If hollow channels are formed in the molded components then the plurality of voids will be formed in the walls of such molded component if both processes are used together. The processes used to form the molded components are either (i) a gas assist process which provides a laminar stream of blowing agent into the stream of molten resin after the molten resin is forced into a partially filled mold or (ii) a structural foam molding process which provides a blowing agent blended into the molten resin prior to the molten resin being forced into the mold.

48 Claims, 8 Drawing Sheets

U.S. PATENT DOCUMENTS

| | | | |
|---|---|---|---|
| 4,632,411 A | | 12/1986 | Badger |
| 4,650,199 A | | 3/1987 | Rehrig |
| 4,783,292 A | | 11/1988 | Rogers |
| 4,824,732 A | | 4/1989 | Hendry et al. |
| 4,942,006 A | | 7/1990 | Loren |
| 5,013,032 A | | 5/1991 | Baum et al. |
| 5,015,166 A | | 5/1991 | Baxi |
| 5,054,689 A | | 10/1991 | Hunerberg et al. |
| 5,098,267 A | | 3/1992 | Cheng |
| 5,112,563 A | | 5/1992 | Baxi |
| 5,151,278 A | | 9/1992 | Baxi et al. |
| 5,203,578 A | | 4/1993 | Davidson et al. |
| 5,255,930 A | | 10/1993 | Jones et al. |
| 5,441,288 A | | 8/1995 | Rehrig |
| 5,458,347 A | | 10/1995 | Chiv |
| 5,531,581 A | | 7/1996 | Donnell, Jr. |
| 5,544,904 A | | 8/1996 | Maher |
| 5,707,659 A | | 1/1998 | Erikson |
| 5,836,596 A | | 11/1998 | Wanzl |
| 5,947,313 A | | 9/1999 | Kern et al. |
| 6,019,918 A | * | 2/2000 | Guergov .................... 264/40.3 |
| 6,063,315 A | * | 5/2000 | Keller et al. ................ 264/40.1 |
| 6,075,113 A | | 6/2000 | Masterman et al. |
| 2002/0135144 A1 | | 9/2002 | Murar et al. |

OTHER PUBLICATIONS

Website: "www.epcongas.com/new/epconframe/body.htm", "epCon: Gas Assist Injection Molding Systems", Copyright 1997, pp. 1–2.

Website: "www.oemerie.com/gas.html", "OEM/ERIE: Gas Assist", p. 1, (undated).

Website: "www.dekalbplastics.com/structural.html", "DeKALB Molded Plastics", Copyright 1999, pp. 1–2.

Website: "www.executive–conference.com/molding97.html", "ECM: International Conference Covering Advance in Plastic Technology", Mar. 24–28, 1997, New Orleans, LA, pp. 1–3.

Website: "www.fortwayneplastics.com", "FWP: Custom and Contract Molder Specializing in: Low Pressure Foam and Gas–Assist Injection Molding", "What is Structural Foam?", "The Structural Foam Molding Process", Copyright 1997–98, pp. 1–7.

Website: "www.matrixplastics.com/gasassist.htm", "Gas Assist Injection Molding", "Injection Molding", Copyright 2000, pp. 1–2.

Website: "www.gasassist.com/aboutgasassist.html", "Gas Assist Molding—Redefining the Standards", Copyright 2000, pp. 105.

"Engineering & Processing News", Modern Plastics, Mar. 1980, pp. 22, 24.

Edward Mason, "Gas Injection Offers New Opportunities", Canadian Plastics, Nov./Dec., 1988, pp. 42–43.

"Two Breakthroughs in Smooth Surface Finish for Structural Foam . . . ", Injection Molding New Brief, vol. VIII, No. 43, Oct. 24, 1979.

Cashiers' Pressure Process, A Revolutionary Development in Structural Foam Molding, Cashiers Plastic, Oct., 1981.

Steve Ham, "Structural Plastics, Fundamentals of Structural Plastics", Plastics Engineering, Jun. 2001, pp. 46–57.

Hoover Universal Brochure, Structural Web gives you quality finish at reduced cost, (undated).

Dave Anderson, et al., "Structural Web Molding" A New Development in Low Pressure Smooth Surface Technology, Hoover Universal, pp. 48–56, (undated).

John Heasman, "Cinpres–gas–assisted injection moulding", Cinpres Limited, pp. 108–110, (undated).

"Cinpress Gas–Injection Case Study", Cinpres Ltd. Brochure (undated).

Article, "Nitrojection Process Description and Advantages", Sajar Plastics, Inc., (undated).

Article, "New Structural Foam Injection Molding With Swirl–Free Smooth Surface and Uniform Solid Skin", Asahi–Dow Limited, (undated).

* cited by examiner

METHOD OF MOLDING A CART USING MOLDING PROCESSES

CROSS REFERENCE

The present invention is a Continuation-in-Part application of U.S. application Ser. No. 09/552,876, filed on Apr. 20, 2000, now abandonded, and assigned to common assignee herewith. The present application claims the benefit of priority to U.S. patent application Ser. No. 09/552,876.

DESCRIPTION

BACKGROUND OF THE INVENTION

1. Field of the Invention

The present invention generally relates to a method of molding a cart and, more particularly, to a method of molding a cart using high pressure and low pressure molding processes.

2. Background Description

Shopping carts are manufactured using many different assembly methods. For example, carts may be assembled with steel (or other metal) or plastic components. In steel cart assemblies, the assembly process can be time consuming and expensive. This may include welding processes as well bolting and other assemblies. These other assemblies may include tube bending, wire forming, plating and the like. For example, the basket of the cart may have to be formed from wires and welded to form the ribbed pattern of the basket, and may also have to be welded to the frame. In combination with the welding, bolts or rivets may also have to be used in order to properly secure the basket to the frame. Components such as, for example, child seats, trays, handles and the like may also have to be bolted or otherwise fastened to the frame or to the basket, itself. It is also known that steel carts have a tendency to weather badly (e.g., rust) as well as bend and twist due to misuse or large loads placed in the basket. This latter problem may cause the wheels to wobble and may effectively render the cart inoperable or at the very least very difficult to maneuver.

Another example of shopping carts may include plastic baskets or other components mounted to a steel frame. The steel frame will still have the same shortcomings as described above. But in addition to these shortcomings, the basket will have to be mounted to the frame via bolts or other fasteners. In addition, other components may also have to be mounted to either the basket or the shopping cart, expending valuable resources. Also, current molding processes (i.e., injection molding techniques) are limited in application, and are capable of only producing solid molded components which have high molded in stress. This contributes to limited chemical and environmental resistance. Also, these molded components exhibit sink marks especially in thick walls or wall cross sections, and may have increased weight due to the need for increased material to mold the solid components. All of these factors significantly contribute to the manufacturing costs of the shopping cart.

In view of the above and other shortcomings, what is needed is an all plastic shopping cart that does not exhibit sink marks or other defects, and offers extended resistance to environmental and use conditions. The plastic cart should have a smooth wall for an appealing appearance, and should have a high stiffness to weight ratio for structural integrity and stylish appearance. The plastic cart should also be easy to manufacture, exhibiting fewer components and low manufacturing costs. The manufacturing process should also produce low molded in stresses. These plastic carts should also exhibit environmental resistance such as UV, rust and chemical resistance, as well as high structural integrity.

SUMMARY OF THE INVENTION

In one aspect of the present invention, a method of molding components of a shopping cart includes plasticizing a resin to a molten form. The resin is then forced into a mold to a mold pressure of approximately 1,500 PSI or less. A blowing agent is then injected into a stream of the molten resin to form a substantially center hollow channel within the molten resin. The molten resin is cooled and a formed substantially hollow plastic component is removed from the mold. A second blowing agent may also be used prior to the forcing step in order to form a plurality of voids within the walls of the substantially hollow plastic component.

In another aspect of the present invention, a blowing agent is injected or blended into the molten resin to form a homogenous mixture. The homogenous mixture is then forced into the mold. The mixture is then cooled and the formed plastic component is removed from the first mold.

In still another embodiment, the molten resin is forced into a mold to create a frame component of the shopping cart. The mold pressure within the mold is approximately greater than 1,500 PSI. The blowing agent is injected into a stream of the molten resin to form a substantially center hollow channel within the frame component.

A combination of these above processes are also contemplated by the present invention. For example, two or more components using any of the above embodiments may be used to form the shopping cart of the present invention. It is also noted that the pressures within the mold may also vary depending on the measurement locations and may include pressure above or below 1,500 PSI.

BRIEF DESCRIPTION OF THE DRAWINGS

The foregoing and other objects, aspects and advantages will be better understood from the following detailed description of the invention with reference to the drawings, in which.

DETAILED DESCRIPTION OF A PREFERRED EMBODIMENT OF THE INVENTION

The method of molding a shopping cart according to the present invention is preferably performed using high pressure or low pressure injection molding techniques. These techniques include (i) high pressure gas assist injection molding, (ii) low pressure gas assist injection molding, (iii) high pressure foam injection molding, (iv) low pressure foam injection molding and (iv) a combination of the above. It should be recognized that the low pressure gas assist injection molding process is also referred to as structural web molding process which is capable of providing substantially hollow channels through the molded component. The use of high pressure gas assist injection molding also forms substantially hollow channels through the molded component. As referred throughout the present description, the hollow channel may have various symmetrical and non-symmetrical cross sections throughout the molded component, and may include cross hairs extending between the inner walls of the channel, itself. The molded component may also have sections with no channels disposed therein. The structural web molding and the high pressure gas assist injection molding processes also provide for a closed cell surface appearance as well as high stiffness to weight ratios and other advantages discussed herein.

The low pressure gas assist injection molding and the low pressure foam injection molding processes are preferably used for molding the frame of the shopping cart. These processes will provide structural integrity and durability to the frame. By way of example, the low pressure gas assist injection molding process will provide a lightweight unit with a high stiffness component (e.g., a capability of manufacturing thicker wall sections) as well as low molded in stress. The low pressure gas assist injection molding process is also capable of eliminating sink marks and providing thicker walled structures, as well as fluctuating wall thickness from thicker to thinner sections (and vice versa) in the same flow channel with a sufficient hollow center channel disposed therein.

On the other hand, the high pressure gas assist injection molding and the high pressure foam injection molding processes are preferably used for molding the basket and other components of the shopping cart such as, for example, a tray and a child seat. The high pressure foam injection molding process results in a molded component having a plurality of voids dispersed therethrough. The high pressure processes also eliminate sink marks and other structural defects that may result from other processes. Of course, either of the processes or a combination of processes may equally be used for molding the frame or basket (or other components) of the shopping cart.

Shopping Cart Manufactured Using the Method of the Present Invention

Figure 1:
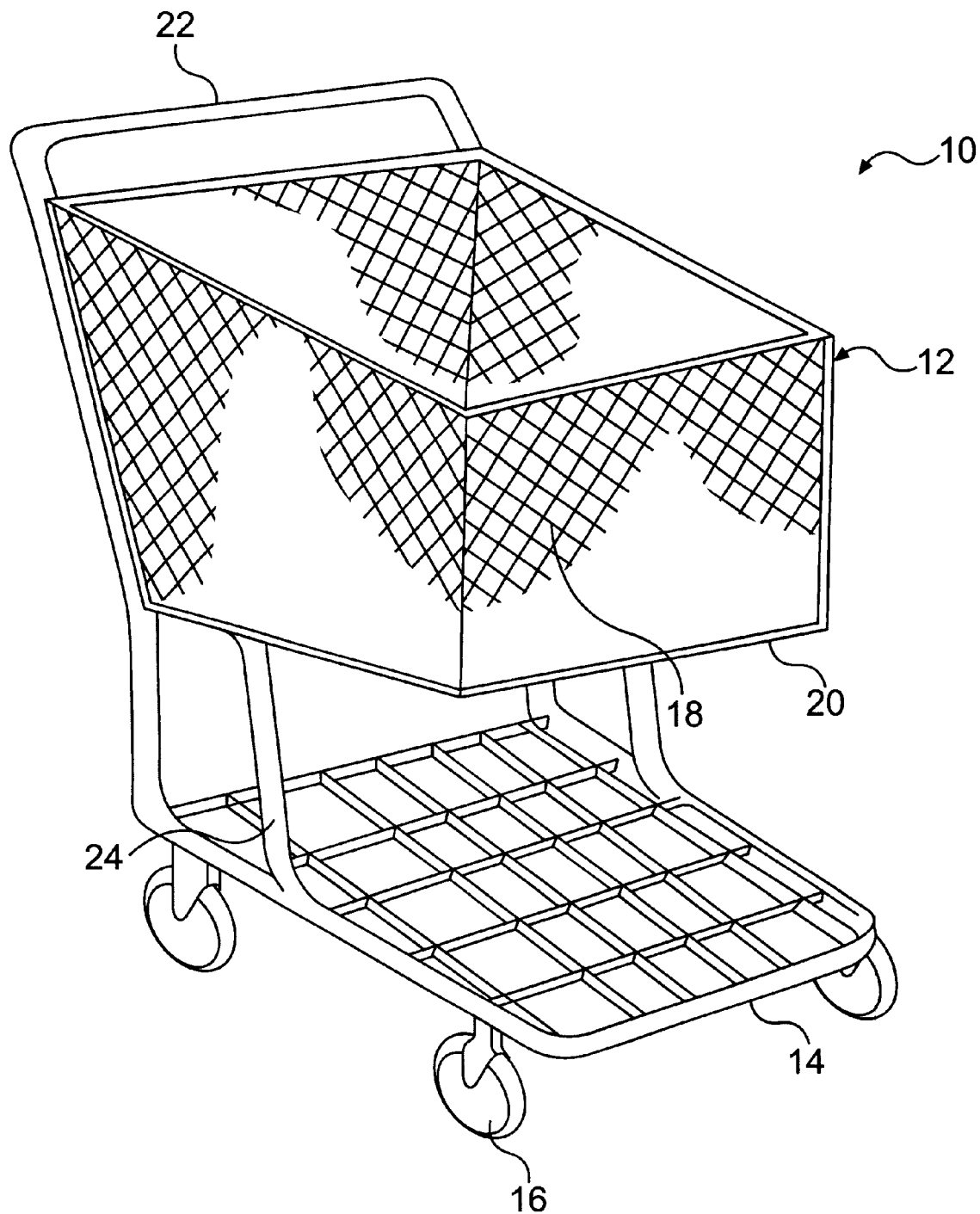
FIG. 1 is a perspective view of a shopping cart molded in accordance with the methods of the present invention.

Referring now to the drawings and more particularly to FIG. 1, an illustrative example of a shopping cart molded in accordance with the methods of the present invention is shown. It should be understood by those of ordinary skill in the art that the shopping cart shown in FIG. 1 is merely an exemplary shopping cart used to describe the methods of the present invention. Accordingly, other shopping cart designs may also be manufactured using the methods of the present invention and, as such, the present invention is not limited, in any manner, to a specific dimension, shape or size shopping cart. Instead, the methods of the present invention may be used to mold a vast array of shopping carts, including carts with child seats, trays, different basket types and the like.

Still referring to FIG. 1, the shopping cart is generally depicted as reference numeral 10 and includes a basket 12 which is attached to a frame 14. Wheels 16 are rotatably mounted to a lower portion of the frame 14. The basket 12 includes sidewalls 18 and a bottom portion 20. The sidewalls 18 and the bottom portion 20 are preferably composed of a lattice or gridwork of ribs; however, other formations of the ribs are also contemplated for use with the methods of the present invention. The frame 14 includes a handle 22 and a lower support 24. The lower support 24 (which may include a cross bar (not shown)) supports the bottom portion 20 of the basket 12. In accordance with the present invention, each of these components are formed by molding processes as discussed in detail below.

Figure 3:
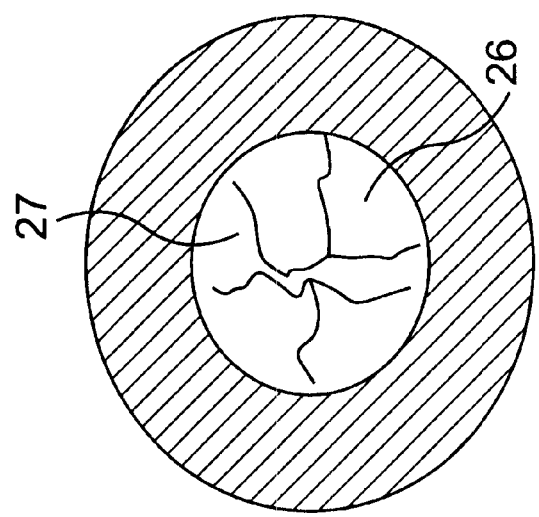
FIG. 3 is an embodiment of a cross sectional view of the molded component of the shopping cart.
Figure 2:
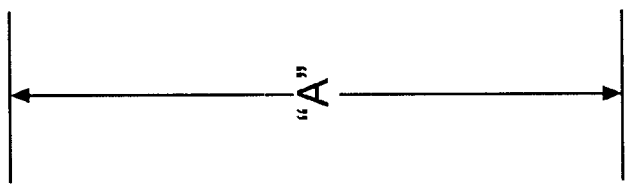
FIG. 2 is a cross sectional view of a molded component of the shopping cart.
Figure 2:
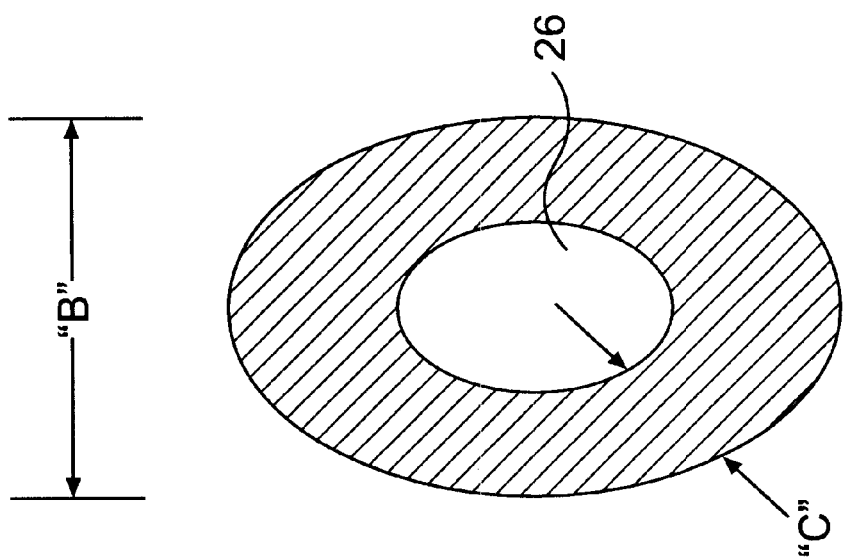

FIGS. 2 and 3 show embodiments of a cross sectional view of the molded frame 14 or other component of the shopping cart. FIG. 2 shows an elliptical cross section and FIG. 3 shows a circular cross section, both having a hollow center channel 26. These embodiments are molded by either high pressure gas assist injection molding or low pressure gas assist injection molding (discussed in more detail with reference to FIGS. 6 and 7). It is noted that the cross sections shown in FIGS. 2 and 3 are dependent on the shape of the mold used for molding the many components of the shopping cart 10, and may also include, for example, D-shaped or non-symmetrical cross sections.

In both of the embodiments of FIGS. 2 and 3, the molded frame 14 or other component preferably includes a hollow center channel 26 which may either be continuous throughout the entire frame 14 (or component) or may be provided only in certain sections throughout the frame 14 (or component). In the latter example, the hollow channel 26 may be divided into many different channels at strategic places throughout the molded component such that solid portions will be positioned at, for example, the corners of the frame 14, the support 24 or near the mountings of the wheels 16. It should be understood by those of ordinary skill in the art that the placement and formation of the hollow channel 26 sections is dependent on the particular performance required for the shopping cart. The hollow channel may include cross hairs 27 disposed there (FIG. 3).

Referring still to FIGS. 2 and 3, the components of the shopping cart 10 molded in accordance with the present invention may vary in wall thickness, cross section and other dimensions throughout the same flow path depending, again, on the specific performance required for the shopping cart. For example, in the embodiment of FIG. 2 the larger cross section of the oblong shape (designated "A") may range from approximately 2 to 2½ inches, but in selected sections may range from approximately 1 to 1¼ inches to a larger cross section of between approximately 4 to 5 inches. In the smaller cross section (designated "B"), a range from approximately 1 to 1½ inches is contemplated by the present invention. In this smaller cross section "B", the range may also vary in selected sections between approximately ½ to ¾ inches and in larger cross sections from approximately 2 to 3 inches. The wall thicknesses, using the methods of the present invention, may also vary between approximately 1½ to ¼ inch in thickness. The specific cross sections and wall thicknesses may also vary throughout the molded component such as at the corners, bends and the like of the frame 14 thus affecting the cross section of the hollow center channel (larger or smaller variations).

Figure 4:
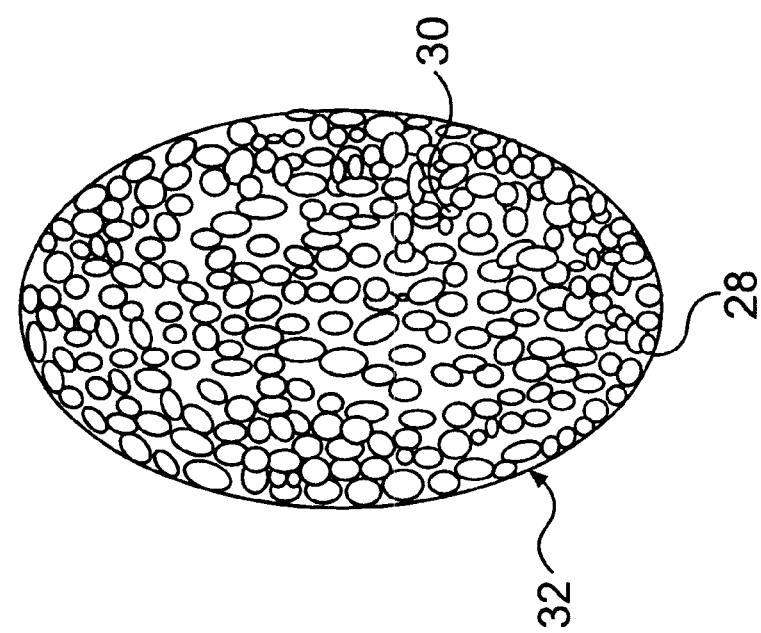
FIG. 4 is an embodiment of a cross sectional view of the molded component of the shopping cart.

FIG. 4 shows a cross section of another embodiment of the present invention formed using either the high pressure foam injection molding or low pressure foam injection molding processes. FIG. 4 may equally represent either the basket 12 or the frame 14 or other component of the shopping cart. In the embodiment of FIG. 4, the molded component includes a foam core 28 comprising a plurality of voids 30. By using either the high pressure foam injection molding or low pressure foam injection molding processes, an open cell appearance 32 will be provided on the surface of the molded component.

Figure 5:
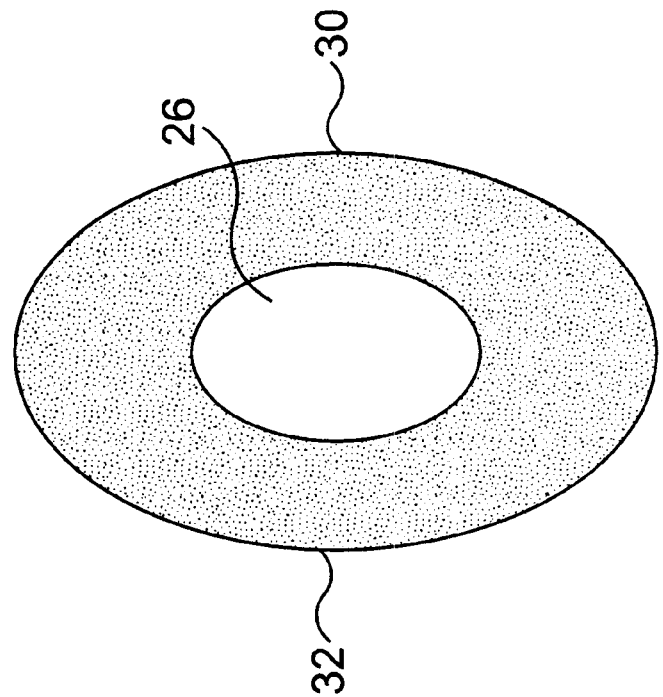
FIG. 5 is an embodiment of a cross sectional view of the molded component of the shopping cart.

FIG. 5 shows a molded component having voids 30 and a hollow center channel 26. Again, the outer surface includes an open cell appearance 32 (much like that shown in FIG. 4). The molded component of FIG. 5 is molded using either a combination of (i) high pressure gas assist injection molding and high pressure foam injection molding or (ii) low pressure gas assist injection molding and low pressure foam injection molding.

Method of Manufacturing the Shopping Cart

In embodiments, the method of molding the shopping cart is either (i) high pressure gas assist injection molding, (ii) low pressure gas assist injection molding, (iii) high pressure foam injection molding, (iv) low pressure foam injection molding or (v) a combination of these processes. The low pressure gas assist injection molding process is preferably used for molding the frame of the shopping cart in order to provide structural integrity and durability to the frame. However, the low pressure foam injection molding process is also contemplated for use in molding the frame, as well as a combination of the molding process of (i) and (iii) or (ii) and (iv).

On the other hand, the high pressure gas assist injection molding process is preferably used for molding the basket and other components of the shopping cart such as, for example, the tray or the child seat. The high pressure foam injection molding may also be used for molding the remaining components of the shopping cart such as the frame. By using the molding processes of the present invention, any component of the shopping cart can be molded in a single molding process while providing for reduced weight and improved durability and stiffness. The molding processes, as shown below, also eliminate sink marks and exhibit low molded in stress of the molded components.

The molding processes of the present invention preferably use moldable resins such as polyolefin or engineering thermoplastics. The polyolefin is preferably either a polyethylene or a polypropylene or other like material used with the methods of the present invention. The engineering thermoplastics may be polycarbonate, acrylonitrile butadiene styrene (ABS), polyester, as examples. A minimum elastic modulus of 300,000 PSI for the molded component using engineering thermoplastics is preferred in the present invention.

Although making no part of the present invention, it should be understood that the low and high pressure injection molding processes of the present invention use different types of molding machines for injecting plasticized resin into a mold. For example, the low pressure processes of the present invention inject the plasticized resins through an accumulator and the high pressure processes of the present invention inject the plasticized resins through a cylinder of a molding machine. These terms may be used interchangeably in the present disclosure for ease of understanding. It should also be understood by those of ordinary skill in the art that the pressures described below with regard to mold pressures and machine pressures relate to the pressure of the plasticized resin within the mold or accumulator or cylinder of the molding machine, respectively.

Low Pressure Gas Assist Injection Molding

Figure 6:
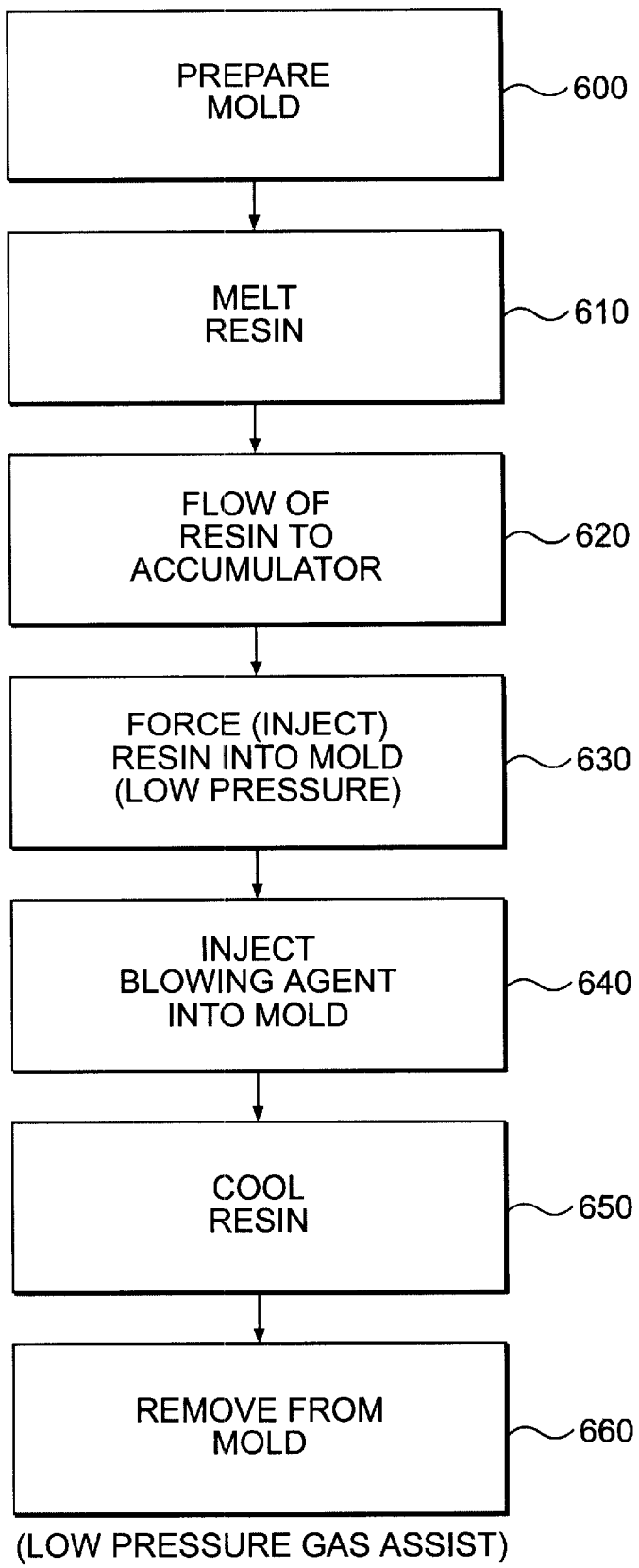
FIG. 6 is a flow chart showing a first molding process of the present invention.

Referring now to FIG. 6, a flow chart describing the low pressure gas assist injection molding process for molding the shopping cart of the present invention is shown. In step 600, the mold for forming the molded component (by flowing the resin melt (polyolefin or engineering thermoplastics)) is prepared for the molding process. The mold is representative of a single component of the shopping cart such as the frame or the basket, and may represent any size or shape thereof. The mold may equally represent the entire shopping cart. By way of example, the mold may be used to form a frame as shown in FIG. 1 with a cross section having an average one inch diameter. A mold having D-shaped or non-symmetrical sections for either the frame or basket (or other component) may equally be used with the present invention. With this said, the present invention is not limited to any particular mold size, shape, configuration or type.

In step 610, the resin (e.g., pelletized plastic) is melted (plasticized) by both pressure and heat or other known methods. The heating temperatures for melting the resin may vary depending on the particular resin material used by the method of the present invention. For example, a thermoplastic engineering material may be heated to a temperature of between approximately 450° F. to 550° F.; whereas a polyolefin material may be heated to a temperature between approximately 350° F. to 450° F.

In step 620, the resin melt flows into an injection cylinder (accumulator). The plastic pressure within the accumulator of the molding machine during the injection stage may be between approximately 2,000 to 3,500 PSI. Once the accumulator is loaded with a predetermined amount of resin melt (the shot), the injection cylinder ram forces (injects) the resin melt through one or more nozzles into the cavity of the mold (step 630). (In embodiments, the nozzle opening is approximately ⅝" in diameter.) The shot size of the resin melt, of course, is dependent on the particular mold used with the method of the present invention, and can easily be calculated by those of ordinary skill in the art without undue experimentation. The plastic pressure within the mold after the injection process is preferably between 300 PSI to 600 PSI, but may be upwards of 1,500 PSI. In this process step, and by way of example, a shot size of 20 pounds of 100% density resin may flow into the mold at a rate between 5 to 45 seconds which may create approximately 300 to 600 PSI of plastic pressure within the mold, itself, and may reach upwards of 1,500 PSI.

In step 640, a blowing agent such as nitrogen, water, fluids or other known blowing agent is injected into the cavity of the mold via a hole placed within a nozzle opening/closing device or other known mechanism. In the embodiments, the blowing agent will begin to be injected into the stream of the resin melt after approximately 60 to 90% of the resin melt is forced into the mold. It should be understood, however, that the blowing agent may also be injected into the stream of the resin melt prior to 60% or subsequent to 90% of the resin melt being forced into the mold. The blowing agent is injected into the mold resulting in a laminar flow, and may be used to reduce the density of the resin melt to approximately 70% to 95% of the original density. In this step, the blowing agent will force the resin melt against the side walls of the mold thereby forming a hollow center channel within the molded component. It is noted that the amount of blowing agent (and resin melt) flowing into the mold will depend on several variables including, but not limited to, (i) the desired thickness of the walls of the molded component, (ii) the desired diameter of the hollow center channel within the molded component and (iii) the size and shape of the mold (or desired cart), itself.

In step 650, the resin melt is then cooled in the mold for a predetermined time to obtain a predetermined temperature.

This allows the resin melt to properly form into the molded component. For example, a thermoplastic engineering material may be cooled to a temperature of between approximately 100° F. to 200° F. On the other hand, a polyolefin material may be cooled to a temperature of between approximately 90° F. to 160° F. Of course, cooling times will depend on several variables such as the amount of resin melt injected into the mold, the wall thickness of the molded component and the like. In step 660, the formed plastic component is removed from the mold thus forming the molded component of the shopping cart.

Several advantages are provided by using the low pressure gas assist injection molding process of the present invention. These advantages include, amongst others, The formation of a hollow center channel in the molded component (see FIGS. 2, 3 and 5). This reduces the weight of the shopping cart without affecting the structural integrity thereof.

A high stiffness to weight ratio which is important from structural and durability product performance.

Less molded in stress (e.g., negligible PSI stress concentration points) than with those of conventional molding methods. The less molded in stresses increase structural integrity and improve both environmental and chemical resistance of molded components including the entire shopping cart.

The formation of thicker walls exhibiting higher strength and stiffness as compared to walls formed with conventional molding methods.

The formation of a closed cell smooth surface.

The elimination of sink marks.

High Pressure Gas Assist Injection Molding

The high pressure gas assist injection molding process may be used for molding the basket, tray or child seat of the shopping cart; however, other components (e.g., the frame) of the shopping cart may equally be molded using this method of the present invention. It is noted that many of the advantages exhibited in the low pressure gas assist injection molding process are also exhibited in the high pressure gas assist injection molding. These advantages include, amongst others, the formation of a hollow center channel in the molded component, a pleasing surface appearance which includes a closed cell surface and the elimination of sink marks and other defects (and other structural benefits).

Figure 7:
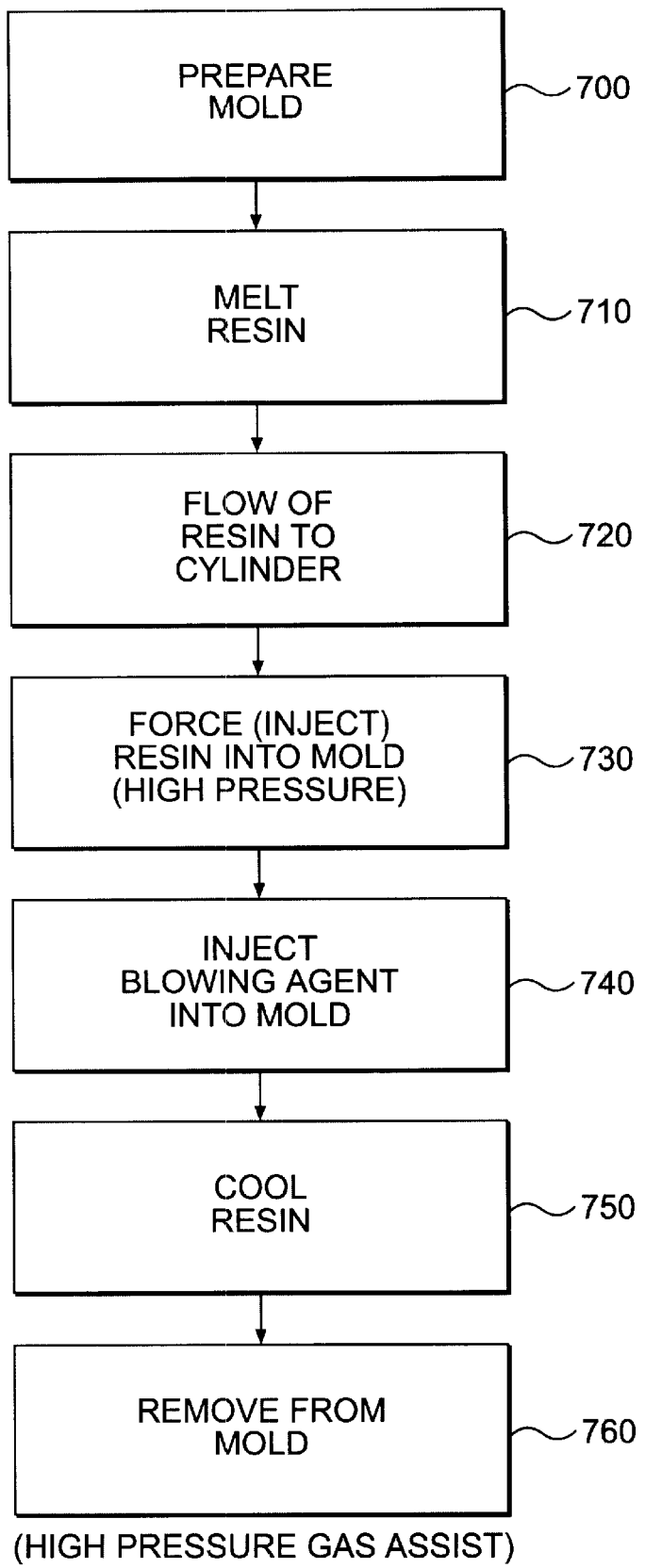
FIG. 7 is a flow chart showing a second molding process of the present invention.

Referring now to FIG. 7, a flow chart describing the process of high pressure gas assist injection molding is shown. In step 700, the mold is prepared for the molding process. Again, the mold is preferably representative of a single component of the shopping cart such as the basket, but may be the entire shopping cart or may represent any size or shape thereof. In step 710, the resin is melted by both pressure and heat or other known methods. The heating temperatures of the resins are the same as described with reference to FIG. 6. In step 720, the resin melt flows through the molding machinery into the cylinder. The plastic pressure within the cylinder of the molding machine during the injection stage may be between approximately 18,000 to 32,000 PSI.

Once the cylinder is loaded with a predetermined amount of resin melt (the shot), the injection cylinder ram forces the resin melt through the nozzle(s) into the cavity of the mold (step 730). Again, the shot size of the resin melt is dependent on the particular mold used with the method of the present invention. The mold plastic pressure, at this stage, is preferably greater than 1,500 PSI but less than 15,000 PSI (depending on the measurement location). In this process step, and by way of example, a shot size of 20 pounds of 100% density resin may flow into the mold at a rate between 5 to 25 seconds and will result in a mold pressure of approximately greater than 1,500 to 15,000 PSI, depending on the measurement location.

In step 740, a known blowing agent is injected into the cavity of the mold via a hole placed within a nozzle opening/closing device or other known mechanism. In the embodiments, the blowing agent will begin to be injected into the stream of the resin melt after approximately 60 to 90% of the resin melt is forced into the mold, but the blowing agent may be injected into the stream of the resin melt at other times. The blowing agent reduces the density of the resin melt to approximately between 70% to 95% of the original density as well as forces the resin melt against the side walls of the mold resulting in a hollow center channel within the molded component. (This same process happens with the low pressure gas assist injection molding process.) The amount of blowing agent (and resin melt) flowing into the mold will depend on several variables as discussed with reference to the method of FIG. 6.

In step 750, the resin melt is then cooled in the mold for a predetermined time to obtain a predetermined temperature. The cooling rates for the thermoplastic engineering materials and the polyolefin materials used in this process are substantially the same as described with reference to FIG. 6. In step 760, the formed plastic component is removed from the mold thus forming the frame or basket or other component of the shopping cart.

Low Pressure Structural Foam Molding

The low pressure structural foam molding process of the present invention is preferably used for the molding of the frame of the shopping cart. However, this same method may also be used to mold the basket, tray and child seat (or other component) of the shopping cart. The use of the low pressure structural foam molding process results in small voids formed within the molded component, itself (see FIG. 4). It is further noted that this process results in an open cell surface appearance with a reduction in molded in stress. The low pressure structural foam molding process also eliminates sink marks at the surface of the molded component and provides other structural benefits.

Figure 8:
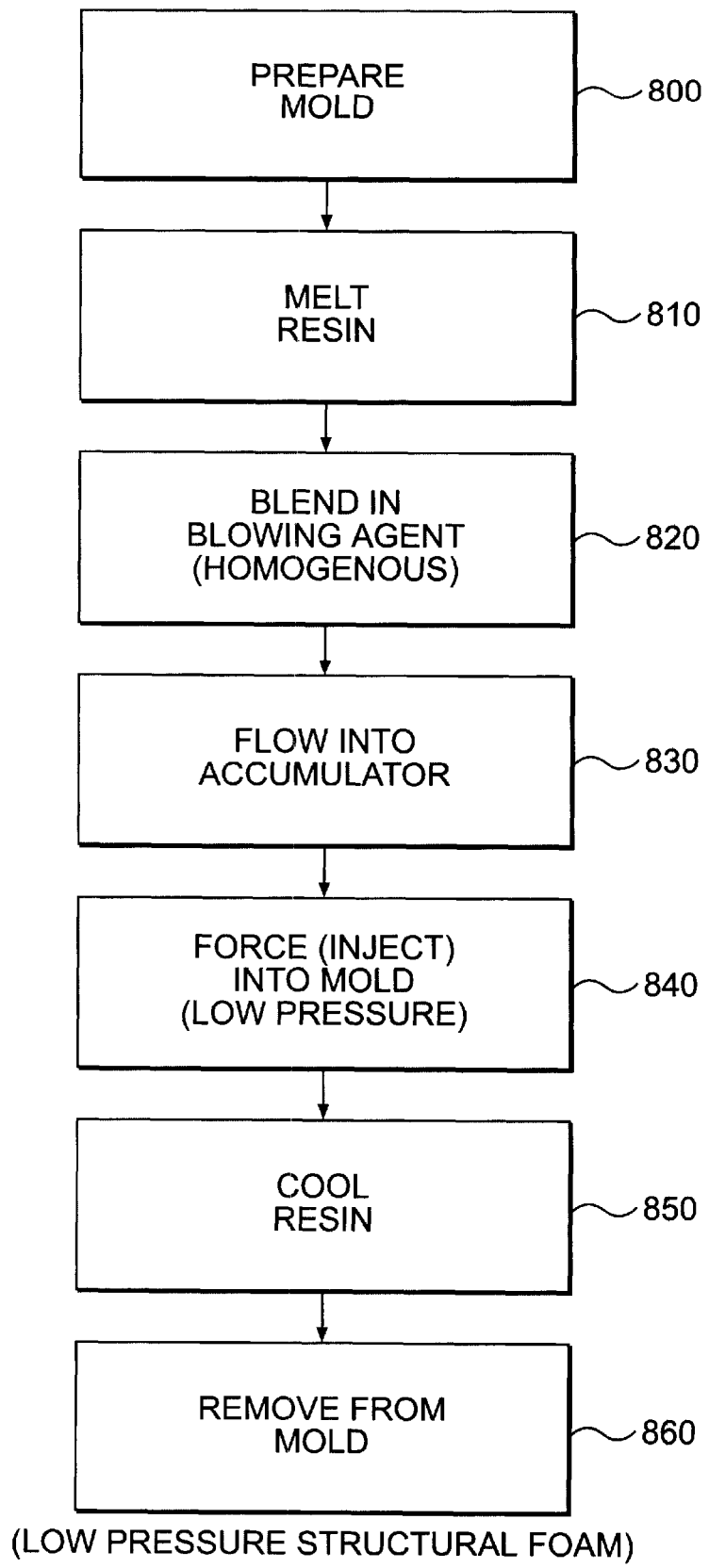
FIG. 8 is a flow chart showing a third molding process of the present invention.

Referring now to FIG. 8, in step 800, the mold is prepared. In step 810, the resin is plasticized (much like that described above). In step 820, a blowing agent such as nitrogen is blended into the resin melt. The blowing agent and the resin melt are mixed into a homogenous mixture in this step. In step 830, a predetermined amount (the shot) of the homogenous mixture is transferred into the accumulator. In step 840, the shot of the homogenous mixture is forced into the mold at between 2,000 to 3,500 PSI during the injection stage (i.e., the pressure within the accumulator). Once injected, the mold plastic pressure will be approximately 300 PSI to 600 PSI, but may be upwards of 1,500 PSI, depending on the measurement location. In the mold, the blowing agent will force the homogenous mixture against the side walls forming a foam-like structure (no hollow center channel). In step 850, the resin melt will be allowed to cool (as described above) and, in step 860, the formed plastic component is removed from the mold after the cooling process.

High Pressure Structural Foam Molding

The high pressure structural foam molding process of the present invention is preferably used for the molding of the basket, tray and child seat; however, other components such as the frame may also be molded using this process. As in the low pressure structural foam molding process, the use of this high pressure process results in small voids formed within the molded component (see FIG. 4) and an open cell surface appearance. The high pressure structural foam molding process also eliminates sink marks at the surface of the molded component, as well as providing other structural benefits as discussed above.

Figure 9:
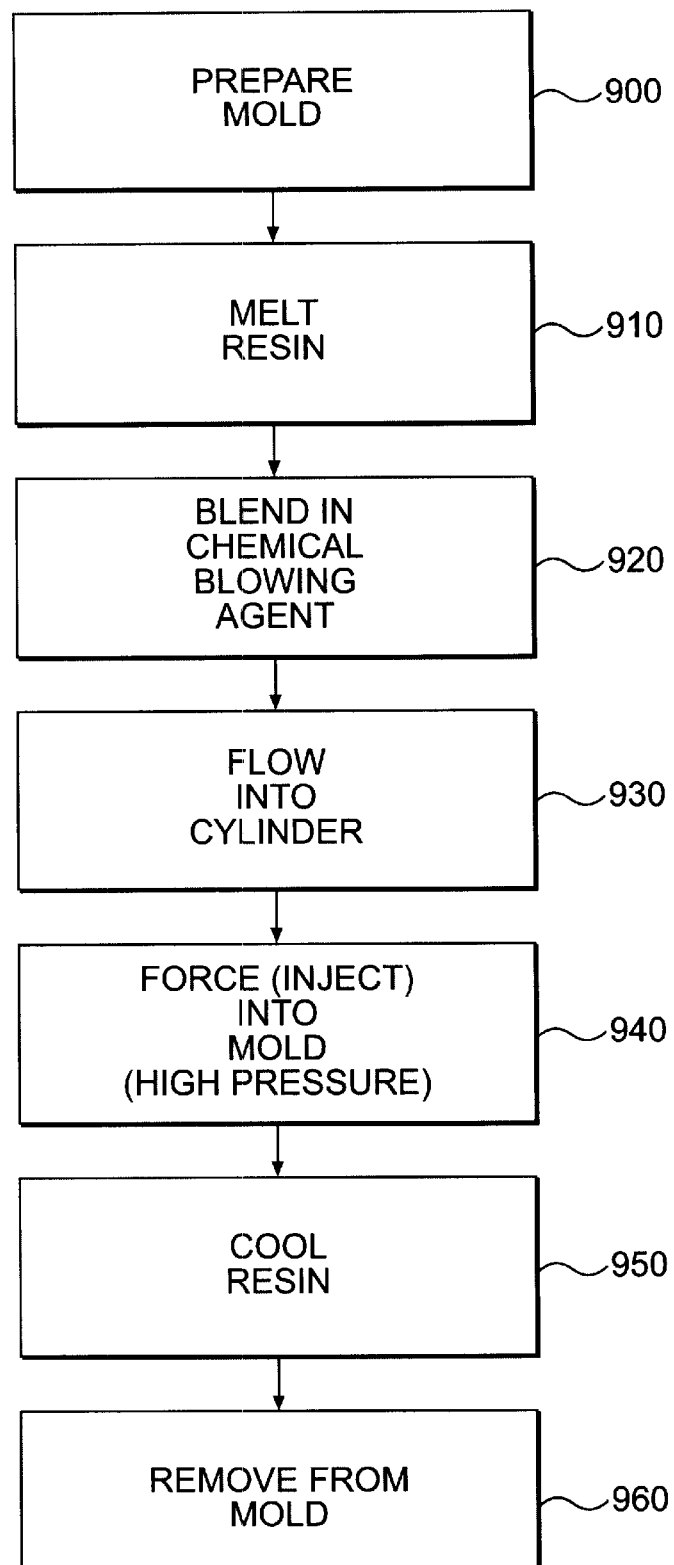
FIG. 9 is a flow chart showing a fourth molding process of the present invention.

Referring now to FIG. 9, in step 900, the mold is prepared. In step 910, the resin is plasticized (much like that described above). In step 920, a chemical blowing agent such as $CO_2$ is blended into the resin melt. The blowing agent and the resin melt are mixed into a homogenous mixture in this step. In step 930, a predetermined amount (the shot) of the homogenous mixture is forced into the cylinder. In step 940, the homogenous mixture is forced into the mold with the cylinder pressure being at between approximately 18,000 to 32,000 PSI during the injection stage. The mold plastic pressure will be approximately greater than 1,500 but less than 15,000 PSI, depending on the measurement location. In the mold, the blowing agent will force the homogenous mixture against the side walls forming a foam-like structure (no hollow center channel). In step 950, the resin melt will be allowed to cool (as described above). In step 960, the formed plastic component is removed from the mold after the cooling process.

Combination Processes

It is also contemplated by the present invention that a combination of methods may also be used to mold the components of the shopping cart. The combination of these methods will form a cross section similar to that shown in FIG. 5; that is, a hollow center channel 26 with a plurality of voids 30 within the wall of the molded component. These combinations include either a combination of (i) high pressure gas assist injection molding and high pressure foam injection molding or (ii) low pressure gas assist injection molding and low pressure foam injection molding. In either of these combinations, the blowing agent will be both blended into the resin melt prior to the resin melt (the shot) being forced into the mold cavity as well as being injected into the stream of the resin melt after a portion of the shot (or entire shot) is forced into the mold. The differences between the combination of (i) high pressure gas assist injection molding and high pressure foam injection molding or (ii) low pressure gas assist injection molding and low pressure foam injection molding is the molding pressures (and molding machines).

Figure 10:
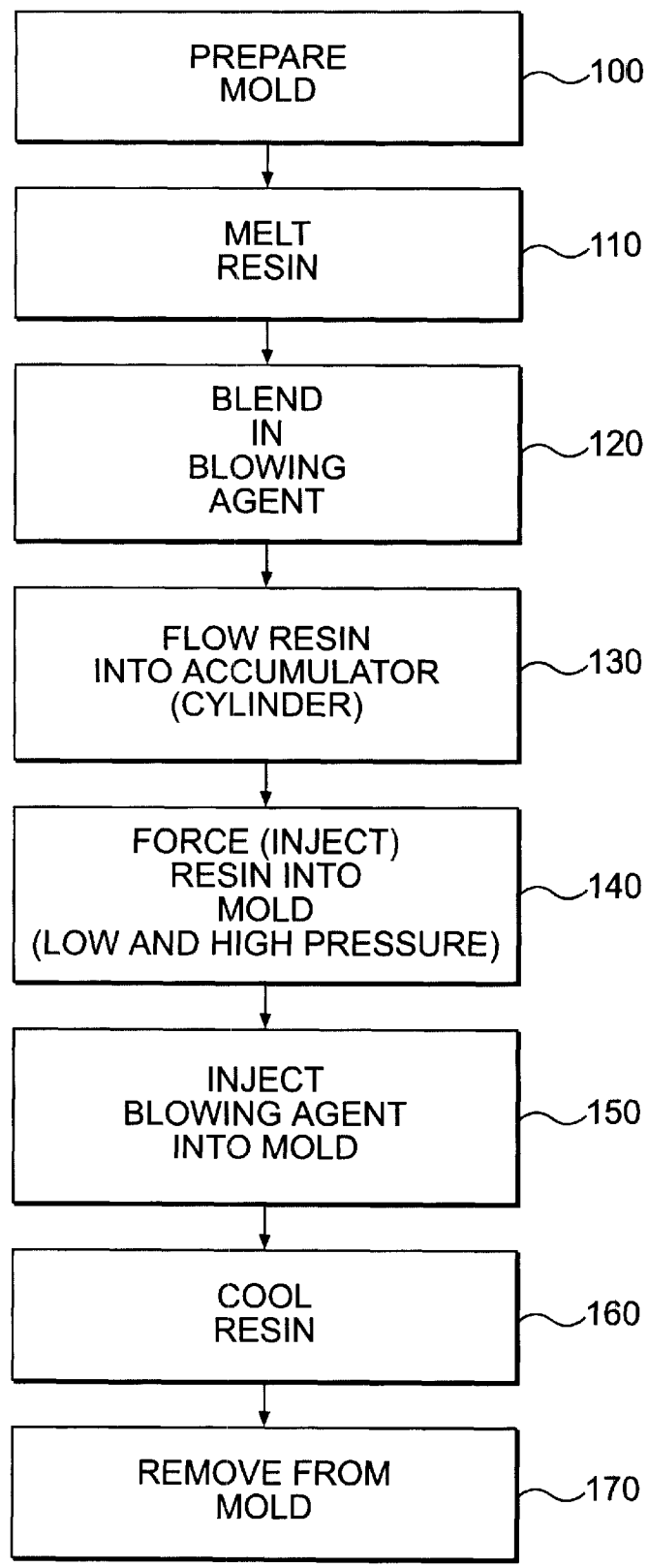
FIG. 10 is a flow chart showing a fifth molding process of the present invention.

Referring now to FIG. 10, an example of the low pressure gas assist injection molding and low pressure foam injection molding process is shown. This same figure can equally represent the high pressure process steps. In step 100, the mold is prepared for the molding process. In step 110, the resin is melted by both pressure and heat or other known methods. In step 120, a blowing agent is blended into the resin melt and is mixed into a homogeneous mixture with the resin melt. In step 130, the resin melt flows through the molding machinery into the accumulator (being readied for injection into the mold) resulting in a plastic pressure of between approximately 1,500 to 3,000 PSI during the injection stage. (In the high pressure combination, the plastic pressure within the cylinder may be approximately between 18,000 to 32,000 PSI.) Once the accumulator is loaded with a predetermined amount of resin melt (the shot), the injection cylinder ram forces the resin melt through the nozzle(s) into the cavity of the mold (step 140). The shot size of the resin, again, is dependent on the particular mold used with the method of the present invention.

In step 150, a known blowing agent is injected into the cavity of the mold via a hole placed within a nozzle opening/closing device or other known mechanism In the embodiments, the blowing agent will begin to be injected into the stream of the resin melt after a portion or the entire amount of resin melt is forced into the mold. (Similar to that described with reference to FIGS. 6 and 7.) Also, the injection of the blowing agent results in a laminar flow and reduction in plastic density. The blowing agent in combination with the homogeneous mixed blowing agent will force the resin melt against the side walls of the mold while forming a hollow center channel and a plurality of voids within the molded component. In step 160, the resin melt is then cooled in the mold for a predetermined time to obtain a predetermined temperature. Once the resin is cooled, the formed plastic component is removed from the mold in step 170 thus forming the frame or basket or other component (including the shopping cart itself) of the shopping cart.

While the invention has been described in terms of several embodiments, those skilled in the art will recognize that the invention can be practiced with modification within the spirit and scope of the appended claims.

Having thus described our invention, what we claim as new and desire to secure by Letters Patent is as follows:

1. A method of molding a shopping cart, consisting essentially of the steps of:

plasticizing a resin to a molten form;

forcing the molten resin at a first pressure into a first mold resulting in a mold plastic pressure of approximately 1,500 PSI or less, the first pressure being greater than the mold plastic pressure;

injecting a blowing agent into a stream of the molten resin to form one of a substantially hollow channel within the molten resin within the first mold and a non-continuous substantially hollow channel within the first mold;

cooling the molten resin to a predetermined temperature; and removing a formed substantially hollow plastic component formed from the cooled molten resin from the first mold.

2. The method of molding a shopping cart of claim 1, wherein the first mold forms a frame component of the shopping cart.

3. The method of molding a shopping cart of claim 1, wherein the injecting step injects the blowing agent into the stream after approximately 60–90% of the molten resin is forced into the first mold.

4. The method of molding a shopping cart of claim 1, wherein the injecting step results in a laminar flow of the blowing agent.

5. The method of molding a shopping cart of claim 1, wherein the first mold is representative of one of a shopping cart component and the shopping cart.

6. The method of molding a shopping cart of claim 1, wherein the resin is one of a thermoplastic engineering material and a polyolefin material.

7. The method of molding a shopping cart of claim 1, wherein the mold plastic pressure is between 300 PSI to 600 PSI.

8. The method of molding a shopping cart of claim 1, wherein the blowing agent reduces a density of a wall formed by the injecting step to approximately 70% to 95% of an original density of the resin melt.

9. The method of molding a shopping cart of claim 1, wherein the injecting step forms walls of varying thicknesses throughout the formed substantially hollow plastic component.

10. The method of molding a shopping cart of claim 1, further comprising the steps of:

forcing further molten resin into a second mold;

injecting the blowing agent into the stream of the further molten resin to form a substantially hollow channel within the further molten resin within the second mold;

cooling the further molten resin in the second mold to a predetermined temperature; and removing a second formed substantially hollow plastic component formed from the cooled further molten resin from the second mold.

11. The method of molding a shopping cart of claim 10, further comprising the step of assembling the first and second formed substantially hollow plastic components into a single assembly.

12. The method of molding a shopping cart of claim 11, wherein the second mold forms one of a basket and a component of the shopping cart.

13. The method of molding a shopping cart of claim 1, wherein the non-continuous hollow channel within the first mold is defined by different hollow channels throughout the first mold.

14. The method of molding a shopping cart of claim 13, further comprising solid portions between the different hollow channels.

15. The method of molding a shopping cart of claim 14, wherein the solid portions are placed at predetermined locations of the first mold.

16. The method of molding a shopping cart of claim 1, wherein the substantially hollow channel and the non-continuous substantially hollow channel include one of (i) various wall thickness and (ii) cross hairs extending therein.

17. A method of molding a shopping cart, comprising the steps of:

plasticizing a resin to a molten form;

forcing the molten resin in a first mold to a mold plastic pressure of approximately 1,500 PSI or less;

injecting a blowing agent into a stream of the molten resin to form a substantially hollow channel within the molten resin within the first mold;

cooling the molten resin to a predetermined temperature;

removing a formed substantially hollow plastic component formed from the cooled molten resin from the first mold; and blending a second blowing agent into the molten resin prior to the forcing step, the second blowing agent and the molten resin forming a homogenous mixture.

18. The method of molding a shopping cart of claim 17, wherein the blending step forms a plurality of voids in wall of the formed substantially hollow plastic component.

19. A method of molding a shopping cart, comprising the steps of:

plasticizing a resin to a molten form;

forcing the molten resin in a first mold to a mold plastic pressure of approximately 1,500 PSI or less;

injecting a blowing agent into a stream of the molten resin to form a substantially hollow channel within the molten resin within the first mold;

cooling the molten resin to a predetermined temperature;

removing a formed substantially hollow plastic component formed from the cooled molten resin from the first mold;

plasticizing further resin into the molten form;

blending a second blowing agent into the further molten resin to form a homogenous mixture;

forcing the homogenous mixture into a second mold;

cooling the further molten resin to a predetermined temperature; and removing a formed plastic component resulting from the cooled further molten resin from the second mold.

20. The method of molding a shopping cart of claim 19, wherein the blending step forms a plurality of voids in walls of the formed plastic component.

21. The method of molding a shopping cart of claim 19, further comprising the step of assembling the formed plastic component and the formed substantially hollow plastic component.

22. A method of molding a shopping cart component or components, comprising the steps of:

plasticizing a resin into a molten form;

blending a blowing agent into the molten resin to form a homogenous mixture;

forcing the homogenous mixture into a first mold;

cooling the molten resin to a predetermined temperature;

removing a formed plastic component formed from the cooled molten resin from the first mold;

forcing further molten resin into a second mold;

injecting a second blowing agent into a stream of the further molten resin to form a substantially hollow channel within the further molten resin within the second mold;

cooling the further molten resin to a predetermined temperature; and removing a formed substantially hollow plastic component formed from the cooled further molten resin from the second mold.

23. The method of molding a shopping cart of claim 20, wherein the blending step forms a plurality of voids in walls of the formed substantially plastic component.

24. The method of molding a shopping cart of claim 23, wherein the forcing step creates a mold pressure within the second mold of approximately 1,500 or greater.

25. The method of molding a shopping cart of claim 22, wherein the forcing step associated with the second mold creates a mold pressure within the second mold of approximately 1,500 PSI or less.

26. The method of molding a shopping cart of claim 25, further comprising the step of assembling the formed plastic component and the formed substantially hollow plastic component into a single assembly.

27. The method of molding a shopping cart of claim 22, wherein the forcing step associated with the second mold creates a mold pressure within the second mold of approximately 1,500 or greater.

28. The method of molding a shopping cart of claim 22, wherein the first mold is a frame component.

29. The method of molding a shopping cart of claim 22, wherein the first mold is a basket component.

30. The method of molding a shopping cart of claim 22, wherein the first mold is representative of one of a shopping cart component and the shopping cart.

31. A method of molding a shopping cart, consisting essentially of the steps of:

plasticizing a resin into a molten form;

blending a blowing agent into the molten resin to form a homogenous mixture;

forcing the homogenous mixture into a first mold;

cooling the molten resin to a predetermined temperature;

removing a formed plastic component formed from the cooled molten resin from the first mold;

plasticizing further resin into the molten form;

blending a second blowing agent into the further molten resin to form a homogenous mixture;

forcing the homogenous mixture in a second mold;

cooling the further molten resin to a predetermined temperature; and removing a second formed plastic component formed from the cooled further molten resin from the second mold.

32. The method of molding a shopping cart of claim 26, further comprising the step of assembling the formed plastic component and the second formed plastic component into a single assembly.

33. A method of molding a shopping cart, comprising the steps of:

plasticizing a resin into a molten form;

blending a blowing agent into the molten resin to form a homogenous mixture;

forcing the homogenous mixture into a first mold;

cooling the molten resin to a predetermined temperature; and removing a formed plastic component formed from the cooled molten resin from the first mold; and injecting a second blowing agent into a stream of the molten resin in the first mold after the forcing step to form a substantially hollow channel in the formed plastic component.

34. The method of molding a shopping cart of claim 33, further comprising the steps of:

forcing further molten resin into a second mold;

injecting a second blowing agent into a stream of the further molten resin at a pressure of 1,500 PSI or greater to form a hollow channel within the further molten resin within the second mold;

cooling the further molten resin to a predetermined temperature; and removing a formed substantially hollow plastic component formed from the cooled further molten resin from the second mold.

35. The method of molding a shopping cart of claim 33, further comprising the steps of:

forcing further molten resin into a second mold;

injecting a second blowing agent into a stream of the further molten resin at a pressure of 1,500 PSI or less to form a hollow channel within the further molten resin within the second mold;

cooling the further molten resin to a predetermined temperature; and removing a formed substantially hollow plastic component formed from the cooled further molten resin from the second mold.

36. The method of molding a shopping cart of claim 33, further comprising the steps of:

forcing further molten resin into a second mold;

cooling the further molten resin to a predetermined temperature; and removing a formed substantially hollow plastic component formed from the cooled further molten resin from the second mold.

37. The method of molding one or more components of a shopping cart, consisting essentially of the steps of:

plasticizing a resin to a molten form;

forcing the molten resin at a shot pressure into a mold to create a frame component of the shopping cart, the mold pressure within the mold being approximately 1,500 PSI or greater, the shot pressure being greater than the mold plastic pressure;

injecting a blowing agent into a stream of the molten resin to form one of a center substantially hollow channel within the frame component and a center non-continuous substantially hollow channel within the frame component;

cooling the molten resin to a predetermined temperature; and removing a formed substantially hollow plastic frame component formed from the cooled molten resin from the mold.

38. The method of molding a shopping cart of claim 37, wherein the injecting step injects the blowing agent into the stream resulting in a laminar flow.

39. The method of molding a shopping cart of claim 37, wherein the blowing agent reduces a density of the molten resin to approximately 70% to 95% of the density.

40. The method of molding a shopping cart of claim 37, wherein the center substantially hollow channel and the center non-continuous substantially hollow channel include one of (i) various wall thickness and (ii) cross hairs extending therein.

41. The method of molding a shopping cart of claim 38, wherein the center non-continuous substantially hollow channel is defined by different hollow channels throughout the frame component having solid portions therebetween.

42. A method of molding one or more components of a shopping cart, comprising the steps of:

plasticizing a resin to a molten form;

forcing the molten resin in a mold to create a frame component of the shopping cart, the mold pressure within the mold being approximately 1,500 PSI or greater;

injecting a blowing agent into a stream of the molten resin to form a center hollow channel within the frame component;

cooling the molten resin to a predetermined temperature; and removing a formed substantially hollow plastic frame component formed from the cooled molten resin from the mold; and blending a second blowing agent into the molten resin prior to the forcing step, the second blowing agent and the molten resin forming a homogenous mixture.

43. The method of molding a shopping cart of claim 42, wherein the second blowing agent forms a plurality of voids in the formed substantially hollow plastic frame component.

44. The method of molding a shopping cart, consisting essentially of the steps of:

plasticizing a resin to a molten form;

forcing the molten resin at a shot pressure into a mold representative of the shopping cart or a component thereof, the mold pressure within the mold being approximately 1,500 PSI or greater, where the shot pressure is greater than the mold pressure;

injecting a blowing agent into a stream of the molten resin to form one of a center hollow channel within the frame component and a center non-continuous hollow channel within the frame component;

cooling the molten resin to a predetermined temperature; and removing a formed substantially hollow plastic frame component formed from the cooled molten resin from the mold.

45. The method of forming a shopping cart of claim 44, wherein the blowing agent is one of a gas and a liquid.

46. The method of molding a shopping cart of claim 44, wherein the non-continuous hollow channel within the frame component is defined as different hollow channels throughout the frame component having solid portions therebetween.

47. The method of molding a shopping cart of claim 44, wherein the substantially center hollow channel and the center non-continuous hollow channel include one of (i) various wall thickness and (ii) cross hairs extending therein.

48. A method of molding a shopping cart, consisting essentially of the steps of:

plasticizing a resin to a molten form;

forcing the molten resin at a first pressure into a first mold at a first mold pressure;

injecting a blowing agent into a stream of the molten resin to form one of a substantially hollow channel within the molten resin within the first mold and a non-continuous substantially hollow channel within the first mold;

cooling the molten resin to a predetermined temperature;

removing a formed substantially hollow plastic component formed from the cooled molten resin from the first mold;

plasticizing a further resin to a molten form;

forcing the further molten resin at a pressure into a second mold;

cooling the molten resin to a predetermined temperature; and removing a formed plastic component formed from the cooled molten resin from the second mold.

* * * * *

UNITED STATES PATENT AND TRADEMARK OFFICE
CERTIFICATE OF CORRECTION

PATENT NO.    : 6,589,458 B2
DATED         : July 8, 2003
INVENTOR(S)   : Norman DeCost It is certified that error appears in the above-identified patent and that said Letters Patent is hereby corrected as shown below:

Column 14,
Line 25, change "claim 38" to -- claim 37 --.

Signed and Sealed this

Fourteenth Day of October, 2003

JAMES E. ROGAN
*Director of the United States Patent and Trademark Office*